(12) United States Patent
Levi et al.

(10) Patent No.: US 9,107,389 B2
(45) Date of Patent: Aug. 18, 2015

(54) SYSTEM AND METHOD FOR TREATING PETS

(71) Applicants: Ron Levi, Tel-Aviv (IL); Guy Martinovsky, Tel-Aviv (IL); Gilad Neuman, Ra'anana (IL)

(72) Inventors: Ron Levi, Tel-Aviv (IL); Guy Martinovsky, Tel-Aviv (IL); Gilad Neuman, Ra'anana (IL)

(73) Assignee: PTV Media Ltd., Ramat Gan (IL)

( * ) Notice: Subject to any disclaimer, the term of this patent is extended or adjusted under 35 U.S.C. 154(b) by 0 days.

(21) Appl. No.: 14/264,351

(22) Filed: Apr. 29, 2014

(65) Prior Publication Data

US 2015/0020749 A1    Jan. 22, 2015

Related U.S. Application Data

(63) Continuation of application No. 13/695,063, filed as application No. PCT/IL2011/000343 on Apr. 28, 2011, now Pat. No. 8,776,730.

(60) Provisional application No. 61/329,275, filed on Apr. 29, 2010.

(51) Int. Cl.
*A01K 15/02* (2006.01)
*G09B 19/00* (2006.01)
*A01K 15/00* (2006.01)

(52) U.S. Cl.
CPC .............. *A01K 15/021* (2013.01); *A01K 15/00* (2013.01); *G09B 19/00* (2013.01)

(58) Field of Classification Search
CPC ..... A01K 5/02; A01K 15/021; A01K 15/025; A01K 15/022; A01K 15/027; A01K 1/0107; A01K 1/031; A01K 1/035; A01K 5/0114; A01K 5/0225

USPC .............. 119/712, 174, 905, 719; 340/573.1, 340/573.2, 573.3, 573.4
See application file for complete search history.

(56) References Cited

U.S. PATENT DOCUMENTS

| | | | |
|---|---|---|---|
| 6,041,737 A * | 3/2000 | Hennigan | 119/165 |
| 6,273,027 B1 * | 8/2001 | Watson et al. | 119/712 |
| 7,409,924 B2 * | 8/2008 | Kates | 119/720 |
| 8,453,601 B2 * | 6/2013 | Zimmerman | 119/51.02 |
| 2008/0236514 A1 * | 10/2008 | Johnson et al. | 119/719 |
| 2009/0031966 A1 * | 2/2009 | Kates | 119/719 |
| 2010/0089327 A1 * | 4/2010 | Gross | 119/51.01 |
| 2011/0192213 A1 * | 8/2011 | Zimmerman et al. | 73/23.3 |
| 2012/0024237 A1 * | 2/2012 | Rice | 119/703 |
| 2012/0079993 A1 * | 4/2012 | Ennaceur et al. | 119/753 |
| 2012/0240863 A1 * | 9/2012 | Araujo | 119/51.01 |

\* cited by examiner

*Primary Examiner* — Yvonne Abbott-Lewis
(74) *Attorney, Agent, or Firm* — Koffsky Schwalb LLC; Mark I. Koffsky

(57) ABSTRACT

A system and method for treating pets, the system comprising: a content provider to provide video and audio content adapted for treating a pet; a video and audio output device for playing the video and audio content; and a feedback interface for providing indications to the content provider about behavior of the pet, wherein the content provider is to adapt the provided content according to the received indications. The method comprising playing video and audio content by a video and audio out-put device, the content comprising: an image adapted for treating a pet; and a sound adapted for treating a pet; receiving indications about behavior of the pet; and adapting the played content according to the received indications.

24 Claims, 6 Drawing Sheets

| Hour | Activity | Suggested Content | Comments |
|---|---|---|---|
| 7AM | Wake up and go for a walk with the opportunity to urinate and defecate | E | While with owner, sometimes spend 10 minutes of playing and petting |
| 7:30 AM | Breakfast | E | Fresh food, fresh water |
| 8:00 AM | Playtime | E<br>B | Some morning playing with or without owner |
| 9:00 AM–12:00 PM | Sleeping | R | Considering the owner is off to work |
| 12:00 PM | Lunch | E | |
| 12:30 PM | Play/Interact | E<br>B | Ideally play with owner/pet or go outside |
| 17:00–20:00 | Eat, drink, play | E<br>B | Play alone/ with owner; go for a walk when he comes back; longer playtime. |

FIG.9

SYSTEM AND METHOD FOR TREATING PETS

CROSS REFERENCE TO RELATED APPLICATIONS

This application is a continuation of U.S. application Ser. No. 13/695,063, filed on Jan. 6, 2013, which is a National Phase Application of PCT International Application No. PCT/IL2011/000343, filed on Apr. 28, 2011, which claims priority to U.S. Application Ser. No. 61/329,275, filed on Apr. 29, 2010, all of which are incorporated herein by reference in their entirety.

BACKGROUND OF THE INVENTION

In some cases or situations pets may need special emotional and/or behavioral care, especially in times when the primary caregiver is not around. Additionally, pets may have particular fears, stresses and/or behavioral problems which may be treated in order to improve the life quality of the pet and of the pet's owner.

For example, certain pets may fear and/or get stressed and/or sad of certain situations, such as riding a car, swimming in water, being left home alone, etc. The pet's behavior in such certain situation may deteriorate the life quality of the pet, of the pet's owner and of other people in the pet's surroundings. For example, the neighborhood residents may suffer from the pet's crying when the pet is left home alone.

Therefore, a solution for treating certain emotional and/or behavioral problems with and/or without presence of a human caregiver may improve the life quality of the pet and of the people in the pet's surroundings.

SUMMARY OF THE INVENTION

Embodiments of the present invention provides a method for treating pets by combinations of especially designed pieces of music, videos, animations, colors, and/or smells.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 illustrates an exemplary table of the pet's activities during the day and the suggested corresponding played contents according to embodiments of the present invention;

Figure 1:
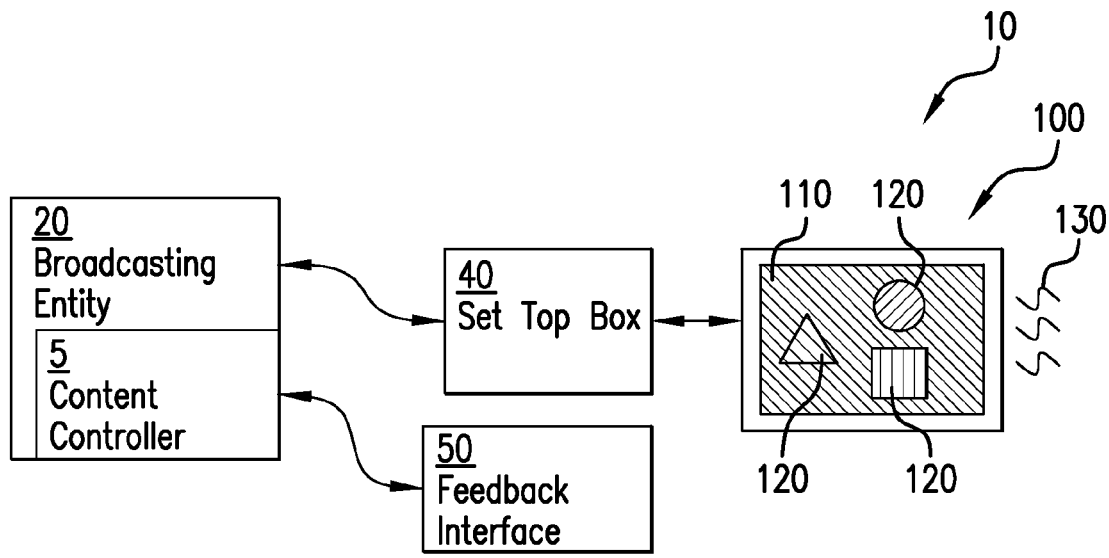
FIG. 1 is a schematic illustration of a system for treating pets by visual and audio content according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Attention is now made to FIG. 1, which is a schematic illustration of a system 10 for treating pets by visual and audio content, for example, video content, according to embodiments of the present invention. System 10 may include a content provider/broadcasting entity 20, a set top box 40, a feedback interface 50 and a video/audio output device 100, such as a display with loudspeakers. Broadcasting entity 20 may broadcast and/or provide content adapted for stimulating the pet, calming the pet, training the pet, treating behavior of the pet, treating emotions of the pet and/or entertaining the pet. The content may be controlled and/or fitted for pets and/or a specific pet by a content provider/controller 5 as described in detail herein. Content provider/controller 5 may receive indications and/or feedback via feedback interface 50 about the behavior of the pet and/or the reaction of the pet to the provided content. The content may be fitted interactively by content provider/controller 5, for example according to the received indications and/or feedback, for example automatically or semi-automatically. The content may be broadcasted by cables, satellite, radio communications and/or any other suitable broadcasting means, and system 10 may include any suitable equipment for communicating the broadcast. The pet fitted content may be received by set top box 40 at a subscriber's premises and displayed, played, sounded and/or executed on and/or by device 100. Additionally or alternatively, broadcasting entity 20 may produce video digital files and distribute the video files online and/or on CD, DVD and/or any other suitable media. For example, the content distributed by broadcasting entity 20 may be included in television channel broadcast, in a taped video, a video file running by a computer, or in any other suitable means for distributing, broadcasting and/or screening the content.

Device 100 may include a monitor, television, or any other kind of screen. Device 100 may also include sound output devices such as loudspeakers for outputting sound signals that may be included in the video content The distributed pet fitted content may include a displayed background 110, one or more displayed images 120, and auditory content (notated by wavy lines) 130. Background 110 and image 120 may be integral or separated. Background 110 and/or image 120 may include still images or video sequence(s).

Displayed background 110 and/or displayed image 120 may include specific color(s) and/or pattern(s) which may have a certain effect on behavior, mood and/or activeness of pets. Usually, the spectrum of colors visible for pets is different than the spectrum of colors visible by humans. For example, dogs can see clearly much less colors than humans. Displayed background 110 and/or displayed image 120 may be designed with enhanced use of colors seen clearly by the pets and reduced use of colors which the pets do not see clearly. For example, for dogs, displayed background 110 and/or displayed image image 120 may include more of the color wavelengths of around 430 nm and around 550 nm, i.e. blue and yellow hues which are the most visible wavelength for dogs. Accordingly, displayed background 110 and/or displayed image 120 may include less of green and red hues which are almost invisible for dogs.

According to some embodiments of the present invention, the distributed video contents which may be reproduced on and/or by device 100 may go through color correction processing in order to make the images more visible for a certain kind of pets, for example dogs. For example, color masks may be used for correcting the colors, such as a yellow mask which may be put over a certain scene in which colors do not stand out for the pets. It is possible to put color mask over the whole image or over certain objects in the image, for example in order that certain objects may be more visible for the pets. The color correction needed for each hue in order to be visible by a certain kind of pet may be derived according to known parameters.

Figure 2:
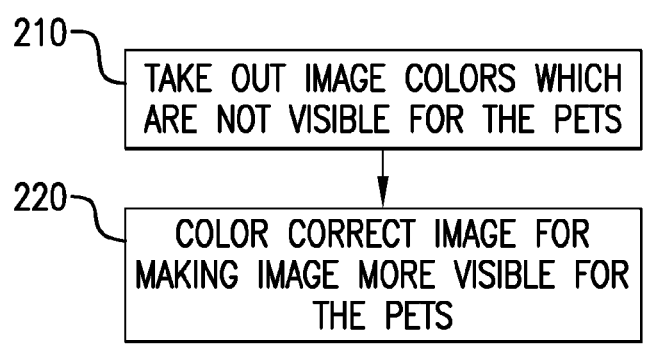
FIG. 2 is a flowchart illustrating a method for color processing of an image according to some embodiments of the present invention.
Figure 3:
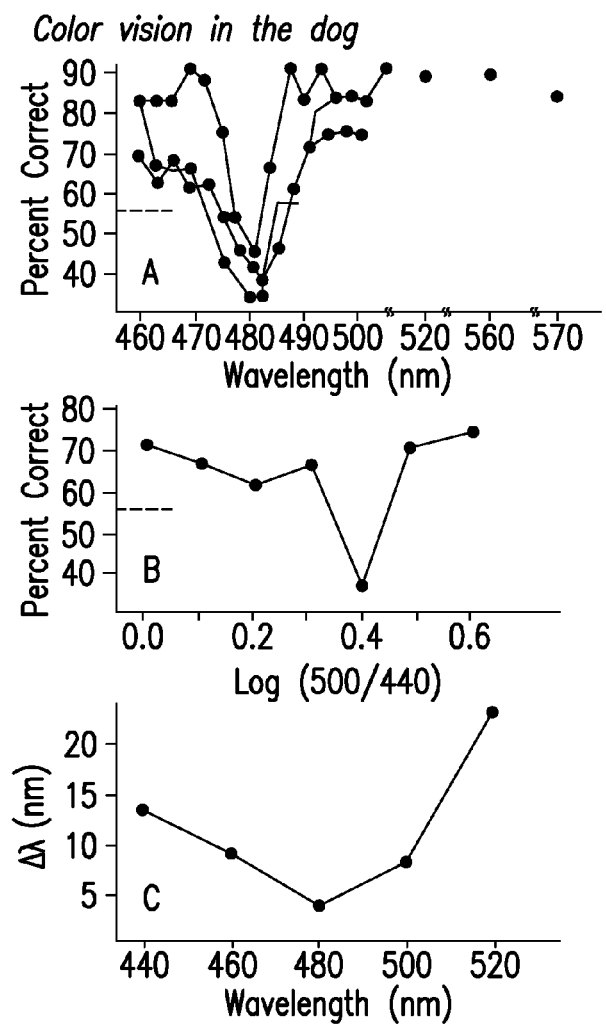
FIG. 3 is an exemplary set of graphs showing factors of color correction for dogs.

Reference is now made to FIG. 2, which is a flowchart illustrating a method for color processing of an image according to some embodiments of the present invention. As shown in block 210, the method may include taking out of the image colors which are not visible for the certain kind of pets for which the display is intended. For example, an operator may view the images, for example, of a video or still images, and take out, for example by a color filter imposed on the image, the image colors which are not visible for the pet. For example, for dogs, the operator may take the green color out of the image. Thus, for example, the image may be adapted to the color sight of the pet. As shown in block 220, the method may include color correcting the image for making the image more visible for the certain kind of pets for which the display is intended. For example, the image or certain objects in the image may be colored, for example by putting a color mask, for example in order that the image or certain objects in the image may be highlighted and/or seen more easily by the pet. For example, the operator may use for the color correction an editing system such as "Avid Symphony Nitris" editing system or any other suitable editing system. The color correction needed for each hue in order to be visible by a certain kind of pet may be derived according to known parameters. For example, FIG. 3 is an exemplary set of graphs showing factors of color correction for dogs.

In designing background 110 and/or images 120, certain aspects of video editing should be taken into consideration due to the fact that pets see screened material on display, such as television set, differently than humans. Television techniques which may be based, for example, on research on pets' vision, may be used in order to adapt and/or edit background 110 and/or image 120 in accordance with pets' vision. The editing may include for example, editing of brightness and contrast to conform pets' vision, special effects designed for pets' vision and reduction of flickering fusion in order to adapt the picture to pets' vision. For example, in order to make the picture more visible for the pet, the contrast and/or brightness editing of the contents of background 110 and/or image 120 may be used. For example, the contrast and/or brightness in a picture or in certain elements of the picture may be increased in order to make the picture or certain elements in the picture more visible for the pet.

Additionally in embodiments of the present invention special video effects may be used in order to grab attention of the pet. For example, a video included in background 110 and/or image 120 may be edited to include motion effects which may be inserted in order to take advantage of the fact that certain pets, for example, dogs, react mainly to moving objects. Motion may be inserted in the content of background 110 and/or image 120 itself, and/or in editing effects. For example, instead of cutting or dissolving the video image, a moving effect may be used. For example, the image or part of image having a moving effect may be colored in a color which may be very noticeable for the pet.

Further in embodiments of the present invention, image 120 may include a video sequence showing a low angle filmed dog in motion. Occasionally, the video may change to show the filmed dog's point of view. Thus, a viewing dog may see a dog in motion and also the dog's route from the filmed dog' point of view. This technique may imitate for the viewing dog its' real life, and thus, for example, the viewing dog may relate to the video.

Background 110 and/or image 120 may also include animations, for example originally and/or specially made animations for pets, for example for the certain kind of pet for which the displayed content is intended. The animations may include moving objects such as, for example, balls, pendulum clock, moving shapes, animated animals in motion and/or any other suitable moving objects. The animations may include colors which conform to the pet vision as described above. For example, for dogs the animations may use mainly blue and yellow hues. The animations may be created especially according to properties of the specific pet's vision. For example, some pets, for example, dogs, may have difficulties in seeing and/or concentrating in too many objects. Accordingly, the animation may include only one or few objects, for example less than certain amount of objects which may be too many for the pet.

At least some of the contents of background 110 and/or image 120 may be created and/or edited according to results of researches made in order to understand the vision capabilities, limitations and/or properties of the certain kind of pet for which the display is intended. Thus visual content may be created especially for the specific kind of pet. This special visual content may be accompanied with auditory content 130 which may be, for example, designed especially for pets, for example for a specific kind of pets. The auditory content may include music and/or sounds. The music and/or sounds may be designed to provoke in the pet a certain desired emotion, mood, activity level and/or behavior. For example, the sounds may include stimulating sounds which may grab the pets' attention, which may include, for example, doorbell, clicker, squeaky, door knock, fire truck, bouncing balls, clocks, animals' sounds and any other stimulating sound. The sound may accompany a corresponding visual content.

In designing auditory content 130, various studies such as researches on pets' hearing, psychoacoustics and/or bioacoustics may be used. The studies may also include, among other things, the correlations between sound frequency, harmonics and/or resonance patterns, animal communications, animal behavior associated with sound, animal auditory mechanisms and/or capacities, sound production, neurophysiology of animals and the effect of sounds on animals.

For example, auditory content 130 may include music designed in order to relax dogs, which may have special properties which may be studied to be effective in relaxing dogs. For example, a specially designed music may include simple musical arrangements and exclude complex musical arrangements. Simple musical arrangement may have a relaxing effect, for example, on dogs. For example, auditory content 130 may include only one or few solo instruments rather than multi-instrumental music. For example, a piano accompanied with a harp may have a relaxing effect. For example, auditory content 130 may include music played between medium and low octaves, e.g. between the second to fourth octaves. For example, auditory content 130 may include repetitive sounds/music. For example, auditory content 130 may include music played in slow tempo, such as in the range of 50-70 beats per minute (bpm).

In cases auditory content 130 is aimed to stimulate the pet, auditory content 130 may include music played in faster tempo, such as in the range of 110-150 bpm. In order to stimulate the pet, auditory content 130 may include music played by an instrument with high frequencies, such as a clarinet.

Figure 4:
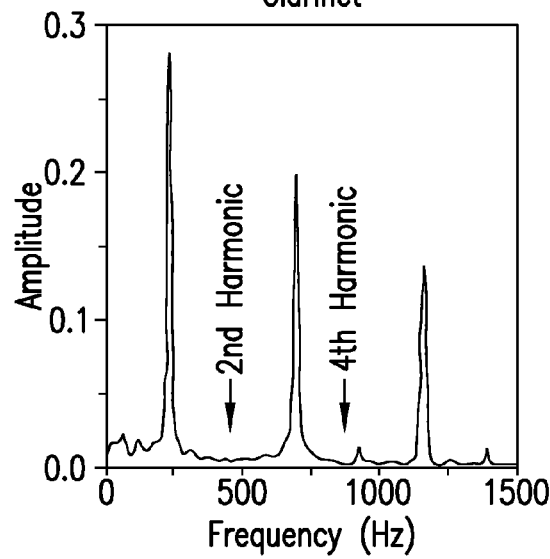
FIG. 4 is an exemplary frequency versus amplitude graph of a clarinet sound.
Figure 5:
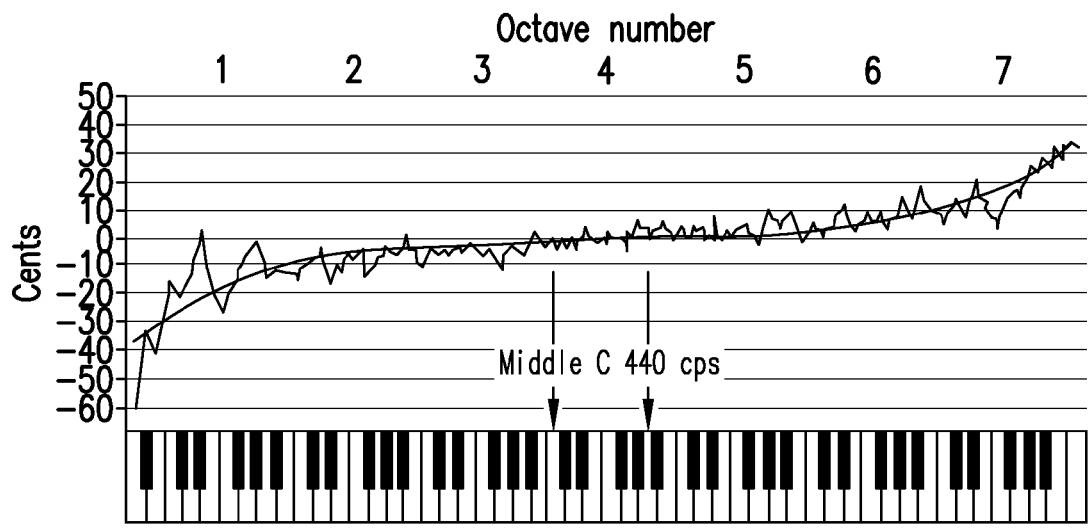
FIG. 5 is an exemplary plot of measurements of a piano tuned by a skilled tuner, along with a curve resulting from the average of many such measurements.

In some embodiments of the present invention, auditory content 130 may include recordings of live instrumental and/or vocal music. Alternatively and/or additionally, the different instruments' sounds can be imitated synthetically. The ratio of carrier to modulating frequency is a main parameter in creating a sound of a specific instrument. For example, for a clarinet, this ratio should be about 2:3. The actual note frequency created is the greatest common divisor of the carrier and modulating frequencies. For example, for a clarinet sound, when we choose the carrier frequency to be about 600 Hz and the modulating frequency to be about 900 Hz, the synthesized note will have a fundamental frequency of about 300 Hz. For example, see FIG. 4 which is an exemplary frequency versus amplitude graph of a clarinet sound. Similar processes may be used in order to synthesize sounds of other instruments, by using the corresponding carrier to modulating frequency ratios. Additionally, some other parameters can be taken into account in synthesizing sounds of instruments. For example, in creating piano sounds, there will be some flattening of the notes in the lower octaves. Sound parameters of different instruments can be derived by making measurements on the actual instruments. For example, see FIG. 5 which is an exemplary plot of measurements of a piano tuned by a skilled tuner, along with a curve resulting from the average of many such measurements.

Figure 6:
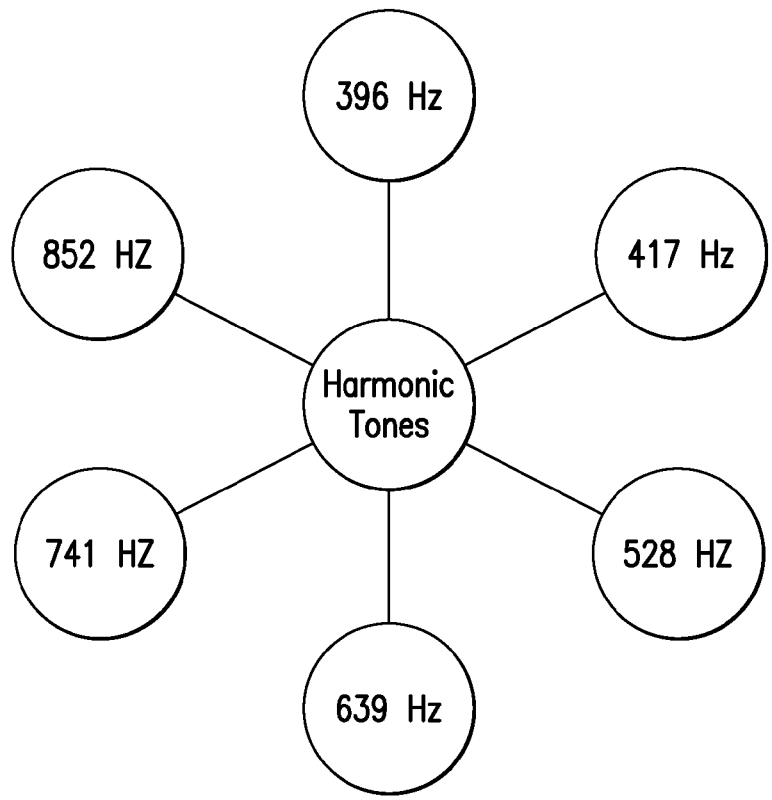
FIG. 6 is a diagram of solfeggio tones (in Hz)

According to some studies, certain frequencies may have healing effects on animals, for example by reducing stress. Pets can become stressed for many reasons and according to some studies, stress affects several health parameters. For example, according to some studies stress may be a factor in destroying enzymes reactions needed for digestion, in increasing harmful hormonal influence and in oxidizing amino acids needed for growth. Accordingly, auditory content 130 may include solfeggio frequencies which are believed to have healing effects. Reference is made to FIG. 6, which is a diagram of solfeggio tones (in Hz). For example, some healing effects are associated with solfeggio frequencies as follows:

1. UT (396 Hz)—liberating guilt and fear;
2. RE (417 Hz)—undoing situations and facilitating change;
3. MI (528 Hz)—transformation, miracles, DNA repairs;
4. FA (639 Hz)—connecting, relationships;
5. SOL (741 Hz)—awaking intuition; and
6. LA (852 Hz)—returning to spiritual order.

One or more of the above frequencies, and possibly other frequencies, may be included in auditory content 130 in order to heal, ease, and make the pet feel better.

According to some beliefs, the sounds may facilitate the self healing of the body by natural mechanisms. The above and other frequencies may be included in auditory content 130 in order to help decreasing the damage of stress in pets by calming them.

The sound frequencies played within auditory content 130 may be played in low volume. In some cases the sound frequencies may be effective in order to positively affect the pet even if the volume is too low to be heard. In some cases the tone can be herd by the pets but not by humans. For example, the volume may be in the range of about 15 db-80 db.

In some embodiments of the invention, the frequencies may be played in evolving periods of time, for example starting with a few times a day and then reducing the periods to a few times a week. Playing the frequencies to often may reduce the effectiveness of the sound frequencies.

Auditory content 130 may include the different frequencies in different times in the day, according to the pet's daily routine. For example, calming tones may be played when it's the pet's time to rest.

Auditory content 130 may be designed by sound-healing experts. In some cases auditory content 130 may affect also humans, and thus for example, a human can also listen to, for example, relaxing auditory content 130 and be affected by it. In some embodiments, auditory content 130 may include harmonics based on the played frequency.

Figure 7:
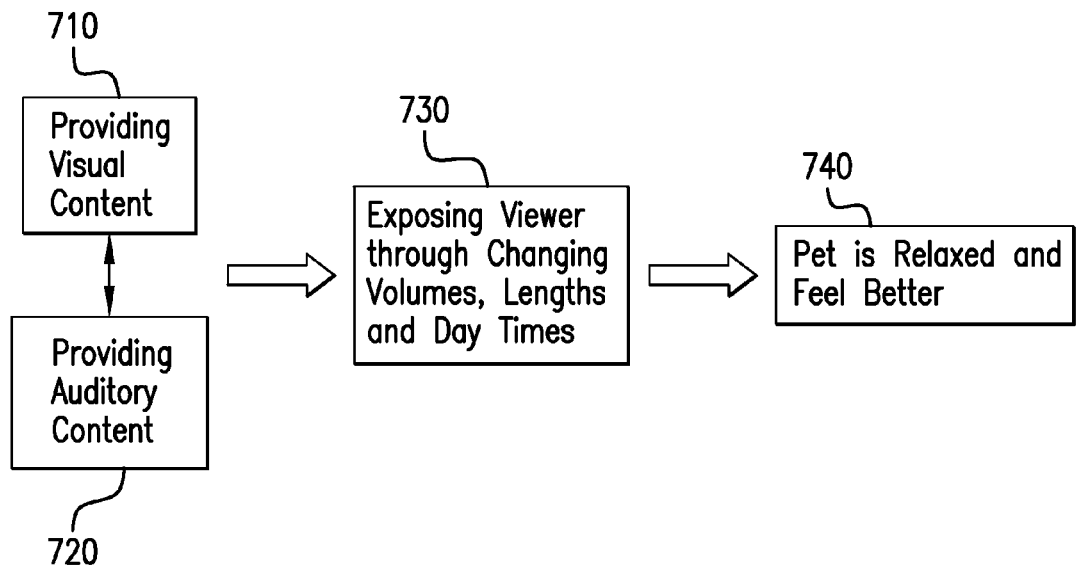
FIG. 7 is a flowchart illustrating a method for relaxing and/or healing a pet according to some embodiments of the present invention.

Reference is now made to FIG. 7, which is a flowchart illustrating a method for relaxing and/or healing a pet according to some embodiments of the present invention. As shown in block 710, the method may include providing visual content as described in detail detail above. As shown in block 720, the method may include providing auditory content as described in detail above, for example, providing solfeggio frequencies as described above. In some embodiments of the present invention the auditory content may preferably be provided in low volume. As shown in block 730, the method may include exposing a viewer pet to the visual and/or auditory content, through changing volumes, lengths and day times, according to the purpose. As shown in block 740, as a result of the previous steps, the pet may feel better and/or be relaxed.

According to some embodiments of the present invention, the distributed pet fitted content may include, for example in different time segments different types of shows for different purposes and/or with different effects on the pet.

For example, the distributed pet fitted content may include in a certain time segment a relaxation show. The relaxation show may include, for example, relatively slow rate video/animation sequences, relaxing especially designed music, for example in low tempo of about 50-70 bpm, relaxing views, landscapes, animations and/or other especially designed relaxing content as described in detail above.

For example, the distributed pet fitted content may include in a certain time segment a "Stimulation" show. The stimulation show may include fast rate video/animation sequences, high tempo music, sequences of dogs playing, special moving animations and games, moving balls and/or other especially designed stimulating content as described in detail above.

Figure 8A:
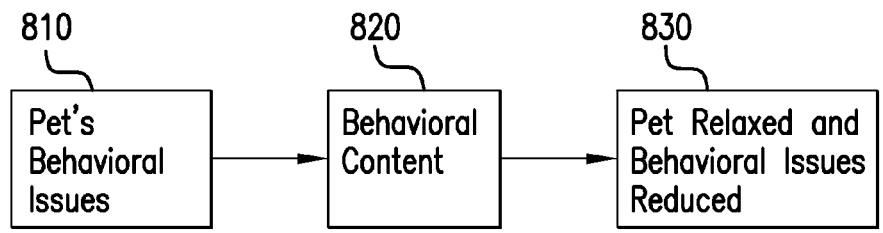
FIGS. 8A and 8B are flowcharts demonstrating the treatment of dogs by a behavioral show according to some embodiments of the present invention.
Figure 8B:
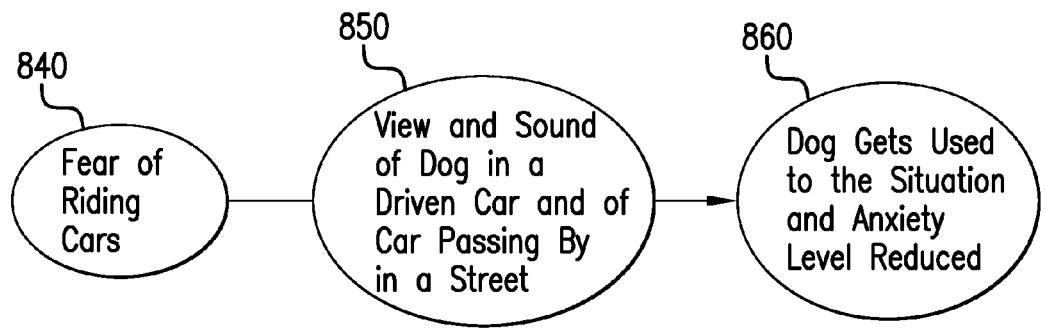

For example, the distributed pet fitted content may include in a certain time segment a habituation show. The purpose of the habituation show may be to help healing dogs from various anxieties. Reference is now made to FIGS. 8A and 8B, which are flowcharts demonstrating the treatment of dogs by a habituation show according to some embodiments of the present invention. As shown in block 810, the pet may have certain behavioral issues. As shown in block 820, the method may include exposing the pet to habituation/behavioral content. As shown in block 830, as a result of the exposure to the habituation content, the pet may be relaxed and the severity of the behavioral issues may be reduced. For example, as shown in block 840, the behavioral issue of the pet may be fear of riding cars. As shown in block 850, the habituation/behavioral content may include, for example, views and/or sounds of a pet in a riding car of cars passing by in a street, or other content, for example, which is related to cars. As shown in block 860, for example, as a result of the exposure to the habituation content relating to cars, the pet may get used top cars and/or to the situation of riding cars, and thus, for example, the anxiety level of the pet in the stressing situation may be reduces.

As mentioned above, the content displayed, played and/or sounded on and/or by device 100 may be conformed to the pet's daily routine. The conforming of the content to the pet's daily routine may be performed according to studies on the pet's activities during the day. Thus, for example, the distributed pet fitted content may include relaxing or stimulating content during the day according to the pet's routine. FIG. 9 illustrates an exemplary table of the pet's activities during the day and the suggested corresponding contents played on and/or by device 100. In the column "suggested content", the letter "E" represents stimulation content, the letter "R" represents relaxing content, and the letter "B" represents habituation content.

The content played on and/or by device 100 may be adapted interactively according to the type of pet, breed, age, conditions and/or behavior of the pet. In some embodiments, the programming of the content played on and/or by device 100 may evolve according to the pet's needs and/or behavioral issues, which may be, for example, reported, for example via feedback interface 50, by the pet's owner, therapist and/or trainer to the programming/content provider/controller 5. Therefore, the programming may be constantly open for changes according to the pet and/or owner's needs.

Figure 10:
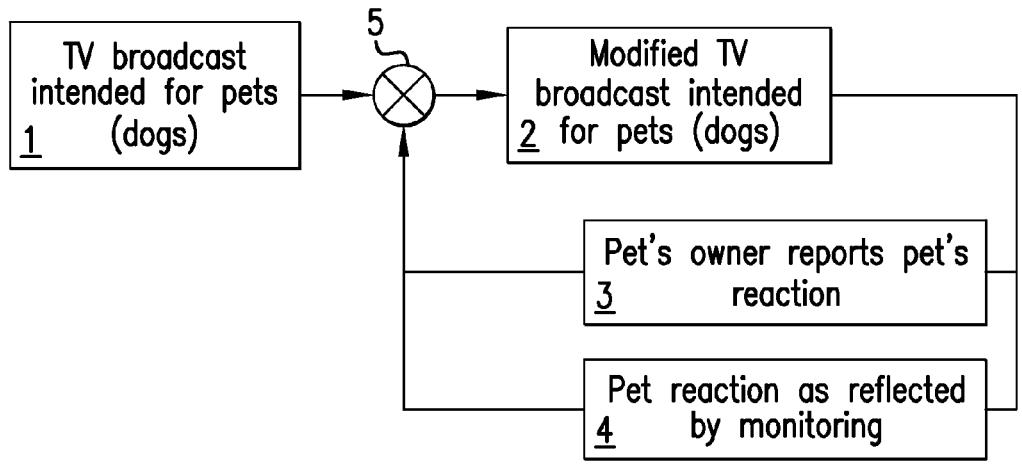
FIG. 10 is a flowchart illustrating a method for interactive content modification through pet monitoring according to some embodiments of the present invention.

In some embodiments of the present invention, the pet may be monitored in real time, for example via feedback interface 50, and the pet's behavior, mood, activity level and/or other parameters may be transmitted on-line to the programming provider/controller 5. The programming of the pet fitted content may be adapted according to the pet's behavior, mood, activity level and/or other parameters substantially in real time, or substantially immediately after the monitored parameters are received by the programming provider/controller 5. The monitoring of the pet may be performed by, for example, web cameras, pet cameras, smart collars, audio systems, and other monitoring devices and methods, which may be included in feedback interface 50. Reference is now made to FIG. 10, which is a flowchart illustrating a method for interactive content modification through pet monitoring according to some embodiments of the present invention. As shown in block 1, audio and/or visual content may be broadcasted on screen, for example, a television channel broadcast, for example, through a content controller/provider 5. For example, the content may be intended for pets such as, for example, dogs. Then, for example, as shown in block 3, the user, such as the pet's owner, therapist and/or trainer, may report to content controller/provider 5, for example via feedback interface 50, pet's parameters such as, for example, the pet's mood, change in mood, behavior, activity and/or reaction to the broadcasted content. Additionally or alternatively, the pet's parameters such as, for example, the pet's mood, change in mood, behavior, activity and/or reaction to the broadcasted content may be monitored through electronic sensors and/or devices and reported to content controller/provider 5, as described in detail above. The monitoring electronic sensors and/or devices may be included in feedback interface 50. As a result, as shown in block 2, content controller/provider 5 may provide modified content adapted to the reported/monitored pet's parameters. For example, in case the pet is a dog which barks intensely at a certain time, the content may be adapted at this certain time to relax the dog. For example, if the dog is anxious and/or irritated, the content may be adapted to relax the dog, for example by music, relaxing views, and other suitable content as described in detail above. For example, if the dog is bored, sad, apathetic, or in any other similar mood, the content may be adapted at this certain time to stimulate the dog. For example, if the dog is sleeping too much and/or does not have enough stimulation needed for showing healthy behavior, the content may be adapted to stimulate the dog, for example, by high rate music, animations, and other suitable content as described in detail above.

In some embodiments of the present invention, the distributed pet fitted content may be used for dog training. For example, the content played on and/or by device 100 may include tutorials for a user, such as the pet's owner, therapist and/or trainer, on how to teach the pet some tricks, for example, while watching and/or listening to the broadcast on and/or by device 100.

In some embodiments of the present invention, the content played on and/or by device 100 may include content which may teach the pet commands, for example without the owner or another trainer. In some embodiments, the training may be performed by monitoring the pet as described above and responding to his behavior, for more effective training. In some embodiments, the training may involve house trainers which may train the pet in combination with the broadcasted training played on and/or by device 100.

Figure 11:
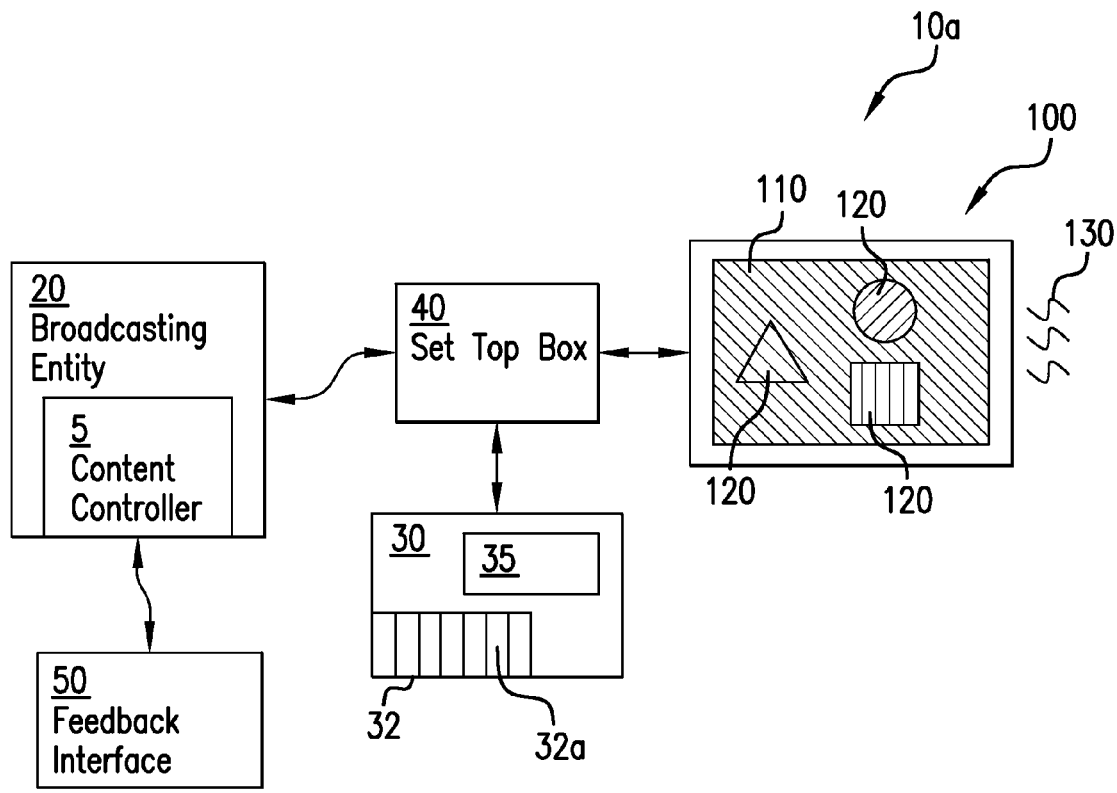
FIG. 11 is a schematic illustration of a system for treating pets by visual, audio and smell content according to embodiments of the present invention.

Reference is now made to FIG. 11, which is a schematic illustration of system 10a for treating pets by visual, audio and smell content according to embodiments of the present invention. System 10a may include a broadcasting entity 20, a set top box 40, a feedback interface 50, a video/audio output device 100 and content controller/provider 5 described in details above. According to some embodiments of the present invention, an additional method for entertaining and/or treating pets, for example treating behavioral problems, emotional problems and/or moods in pets such as, for example, stress and/or loneliness, may include producing various scents, for example scents adapted to the smelling sense abilities of the pet and/or to the smell preferences of the pet and/or to the smell influences on the pet. Accordingly, system 10a may include an aromatizing device 30, which may produce scents suitable for treating/entertaining the pet. Device 30 may include scent controller 35 and cartridge case 32 of various scent cartridges. Device 30 may be connected to set top box 40 and/or device 100, and release various scents by controlling device 30 to activate a suitable scent cartridge according to instructions embedded in the broadcasted and/or played content.

For example, when the broadcasted visual content includes a dog walking on grass, a scent of fresh grass may be released from the suitable cartridge(s) in cartridge case 32, for example by controller 35, for example in order to calm, stimulate, entertain and/or treat the pet. It is already known that aromatherapy may help in reducing stress, separation anxiety and thunder fear in pets. Accordingly, in some embodiments of the present invention, various tested scents may be used for treating a pet, for example for facilitating relaxation in the pet and/or for stimulating, calming, entertaining and/or training the pet, treating behavior and/or emotions of the pet and/or arousing certain emotions in the pet. Most common and known calming scents include lavender, marjoram, valerian, spikenard (also spelled spikenarde), neroli, green mandarin, fox urine and vanilla anis.

Aromatizing device 30 may spread suitable scents for a pet according to its emotional and/or behavioral state. For example, aromatizing device 30 may spread pleasant scents for the pet when a potentially stressing content is played on and/or by device 100, thus, for example, relieving the stress by linking pleasant smells with such situations as situations as displayed and/or sounded. For example, the displayed and/or sounded content may include a scene in which a dog is inside a driving car, for example, in a "habituation" segment of the broadcast, for example, which is intended to familiarize pets with the experience of a ride in a car. Together with this potentially stressing content, aromatizing device 30 may release a peasant scent such as, for example, of lavender, to link a car ride with a pleasant scent and/or a positive experience for the pet.

In some embodiments of the present invention, the pet-fitted content may include instructions embedded in suitable chronological portions of the content, for example in code embedded in the video signal. The embedded code may instruct aromatizing device 30 to release a specific scent from one of it's cartridges. For example, code "a" may instruct aromatizing device 30 to activate a certain cartridge 32a of a certain scent to release the certain scent, for example by controller 35. Due to the developed sense of smell among certain pets such as dogs, the amount of scent released may be very low, thus, for example, the owner of the pet may not be able to sense the smell, while the pet may sense and/or react to it.

The embedded code may include instructions for aromatization device 30 specifying the cartridge(s) that has to be activated together with the corresponding chronological region of the displayed and/or sounded content. Additionally, the instructions for aromatization device 30 in the embedded code may specify the required intensity and/or duration of activation of the specified cartridge(s). For example, the embedded code may instruct aromatization device 30 to activate a certain cartridge 32a for a certain amount of time and for certain duration, for example to activate a cartridge of lavender scent for 60 seconds.

As described above, in some embodiment of the present invention, content controller/provider 5 may interactively adapt the visual, audio and/or smell content according to the behavior and/or activity level of the pet, which may be reported to content controller 5 via feedback interface 50, for example automatically such as by electronic sensors or semi-automatically and/or according to reporting by the owner/trainer of the pet about the behavior and/or activity level of the dog.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for treating pets, the system comprising:
a content provider to provide video and audio content adapted for treating a pet;
a video and audio output device for playing the video and audio content, wherein a frequency in which the audio content is being played is a frequency associated with solfeggio frequencies.

2. The system according to claim 1, wherein the frequency associated with solfeggio frequencies is at least one of 396 Hz, 417 Hz, 639 Hz, 741 Hz and 852 Hz.

3. The system according to claim 1, further comprising an aromatization device to release scents according to instructions embedded in the provided content.

4. The system according to claim 2, wherein the aromatization device comprises a controller and a cartridge case of various scent cartridges, the controller controls the aromatization device to activate a suitable scent cartridge according to the embedded instructions.

5. The system according to claim 1, wherein the video content comprises color correction processing adapting the colors to the vision abilities of the pet.

6. The system according to claim 5, wherein said color correction processing comprises enhanced color wavelengths of at least one of around 430 nm and around 550 nm.

7. The system according to claim 1, wherein the video content is adapted to reduce flickering fusion.

8. The system according to claim 1, wherein the audio content is played in the range of 50-70 bpm.

9. The system according to claim 1, wherein the audio content is played in the range of 110-150 bpm.

10. The system according to claim 1, further comprising a feedback interface for providing indications to said content provider about behavior of the pet, wherein said content provider is to adapt the provided content according to the received indications.

11. The system according to claim 10, wherein said feedback interface comprises electronic sensors for monitoring behavior of the pet and for providing indications to said content provider about behavior of the pet.

12. The system according to claim 10, wherein said feedback interface enables a user to provide indications to said content provider about behavior of the pet.

13. A method for treating pets, the method comprising:
playing video and audio content by a video and audio output device, the content comprising:
an image adapted for treating a pet;
and a sound adapted for treating a pet, wherein the sound includes a frequency associated with solfeggio frequencies.

14. The method according to claim 13, the frequency associated with solfeggio frequencies is at least one of 396 Hz, 417 Hz, 639 Hz, 741 Hz and 852 Hz.

15. The method according to claim 13, wherein the video content is adapted for at least one of a list comprising stimulating the pet, calming the pet, training the pet, treating behavior of the pet, treating emotions of the pet and entertaining the pet.

16. The method according to claim 13, wherein said video content includes embedded instructions for instructing an aromatizing device to release scents suitable for treating the pet in accordance with the played content.

17. The method according to claim 16, wherein said releasing of scents is by controlling the aromatization device to activate a suitable scent cartridge in a cartridge case of various scent cartridges according to the embedded instructions.

18. The method according to claim 16, wherein the scents released according to the embedded instructions are suitable for at least one of a list comprising stimulating the pet, calming the pet, training the pet, treating behavior of the pet, treating emotions of the pet and entertaining the pet, in accordance with the played content.

19. The method according to claim 13, comprising processing colors in said video content to adapt the colors to the vision abilities of the pet, wherein the color processing comprises taking out colors which are not visible by the pet and correcting the colors for making the image more visible for the pet.

20. The method according to claim 19, wherein said color processing comprises enhancing color wavelengths of at least one of around 430 nm and around 550 nm.

21. The method according to claim 13, comprising processing video by reducing flickering fusion.

22. The method according to claim 13, wherein the audio content is played in the range of 50-70 bpm.

23. The method according to claim 13, wherein the audio content is played in the range of 110-150 bpm.

24. The method according to claim 13, comprising conforming the played content to the daily routine of the pet.

\* \* \* \* \*